United States Patent
Norkin

(10) Patent No.: US 10,742,986 B2
(45) Date of Patent: Aug. 11, 2020

(54) HIGH DYNAMIC RANGE COLOR CONVERSION CORRECTION

(71) Applicant: NETFLIX, INC., Los Gatos, CA (US)

(72) Inventor: Andrey Norkin, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 15/725,267

(22) Filed: Oct. 4, 2017

(65) Prior Publication Data
US 2018/0048892 A1    Feb. 15, 2018

Related U.S. Application Data

(63) Continuation-in-part of application No. 15/179,857, filed on Jun. 10, 2016, now Pat. No. 10,080,005.
(Continued)

(51) Int. Cl.
*H04N 19/132* (2014.01)
*H04N 19/85* (2014.01)
(Continued)

(52) U.S. Cl.
CPC ............. *H04N 19/132* (2014.11); *H04N 1/60* (2013.01); *H04N 9/646* (2013.01);
(Continued)

(58) Field of Classification Search
None
See application file for complete search history.

(56) References Cited

U.S. PATENT DOCUMENTS 7,843,465 B1   11/2010   Shaick
8,089,670 B2   1/2012   Schweid
(Continued)

FOREIGN PATENT DOCUMENTS

CN   103714570 A   4/2014
CN   103747162 A   4/2014
(Continued)

OTHER PUBLICATIONS

François et al., "About using a BT.2020 Container for BT.709 Content", ISO/IEC JTC1/SC29/WG11 MPEG2013/M35255, Oct. 2014, Strasbourg, France, 15 pages.
(Continued)

*Primary Examiner* — Edward Martello
(74) *Attorney, Agent, or Firm* — Artegis Law Group, LLP

(57) ABSTRACT

One embodiment of the present invention sets forth a technique for correcting color values. The technique includes downsampling first color space values to generate downsampled color space values and upsampling the downsampled color space values via a first upsampling filter type to generate second color space values. The technique further includes modifying at least one component value included in the downsampled color space values based on a first component value included in the first color space values, a second component value included in the second color space values, and an approximation of a nonlinear transfer function. The technique further includes at least one of (i) storing an indication of the first upsampling filter type in conjunction with a video bitstream associated with the at least one component value, and (ii) transmitting the indication of the first upsampling filter type to a receiving device in conjunction with the video bitstream.

20 Claims, 7 Drawing Sheets
(2 of 7 Drawing Sheet(s) Filed in Color)

Related U.S. Application Data

(60) Provisional application No. 62/404,720, filed on Oct. 5, 2016, provisional application No. 62/256,080, filed on Nov. 16, 2015, provisional application No. 62/253,098, filed on Nov. 9, 2015.

(51) Int. Cl.
  *H04N 9/64* (2006.01)
  *H04N 19/186* (2014.01)
  *H04N 1/60* (2006.01)

(52) U.S. Cl.
  CPC ........... *H04N 19/186* (2014.11); *H04N 19/85* (2014.11); *G06T 2207/20208* (2013.01)

(56) References Cited

U.S. PATENT DOCUMENTS

| | | |
|---|---|---|
| 2004/0155980 A1 | 8/2004 | Itoh et al. |
| 2008/0069239 A1* | 3/2008 | Yan .................. H04N 19/33 375/240.21 |
| 2012/0294362 A1* | 11/2012 | Sikora .................... H04N 19/82 375/240.14 |
| 2014/0198181 A1* | 7/2014 | Chen .................... H04N 19/597 348/43 |
| 2014/0254681 A1* | 9/2014 | Aminlou .............. H04N 19/105 375/240.16 |
| 2015/0271509 A1 | 9/2015 | Minoo |
| 2016/0269733 A1 | 9/2016 | Tourapis |
| 2016/0360215 A1 | 12/2016 | Rusanovskyy |
| 2017/0118489 A1 | 4/2017 | Berbecel |
| 2017/0134703 A1 | 5/2017 | Norkin |
| 2017/0188000 A1 | 6/2017 | Rosewarne et al. |
| 2017/0208310 A1 | 7/2017 | Ström et al. |

FOREIGN PATENT DOCUMENTS

| | | |
|---|---|---|
| EP | 2 365 472 A2 | 9/2011 |
| EP | 3 185 558 A1 | 6/2017 |
| JP | 2008-508802 A | 3/2008 |
| JP | 2018-511210 A | 4/2018 |
| WO | 2006/015107 A2 | 2/2006 |
| WO | 2016/130066 A1 | 8/2016 |

OTHER PUBLICATIONS

Stessen et al., "Chromaticity Based Color Signals for Wide Color Gamut and High Dynamic Range", ISO/IEC JTC1/SC29/WG11 MPEG2014/M35065, Oct. 2014, Strasbourg, France, 55 pages.
Storm, Jacob, "Investigation of HDR Color Subsampling", ISO/IEC JTC1/SC29/WG11 MPEG2014/M35841, Feb. 2015, Geneva, Switzerland, 24 pages.
Tourapis, Alexis M., "HDRTools", retrieved from https://gitlab.com/standards/HDRTools, retrieved on Apr. 12, 2018, 2 pages.
International Search Report and Written Opinion for PCT/US2016/061190 dated Feb. 24, 2017.
Sullivan, "Report of Question 6/16 Visual coding", TD 215 R1 (WP3/16), ITU-T Draft; Study Period 2013-2016, International Telecommunication Union, Geneva; CH, Microsoft Corp. USA, vol. 1/16, Oct. 23, 2015, 24 pages.
Strom, et al., "Ericsson's Response to CFE for HDR and WCG", 112, MPEG Meeting; Jun. 22, 2015; Warsaw; Motion Picture Expert Group or ISO/IEC JTC1/SC29/WG11), 11 pages.
Non-Final Office Action for U.S. Appl. No. 15/179,857, dated Sep. 5, 2017.
Call for Evidence {CfE) for HDR and WCG Video Coding ISO/IEC (MPEG) http://mpeg.chiariglione.org/standards/exploration/high-dynamic-range-and-wide-colour-gamut-content-distribution/call-evidence.
Recommendation ITU-R BT.709: "Parameter values for the HDTV standards for production and international programme exchange".
Recommendation ITU-R BT. 1886 : "Reference electro-optical transfer function for flat panel displays used in HDTV studio production".
DECE, "Common File Format & Media Formats Specification version 2.1", Digital Entertainment Content Ecosystem (DECE), http://www.uvcentral.com/sites/default/flles/files/PublicSpecs/CFFMediaFormat-2_1.pdf.
Recommendation ITU-R BT.2020: "Parameter values for ultra-high definition television systems for production and international programme exchange", http://www.itu.int/rec/R-REC-BT.2020/en.
SMPTE ST 2084: "High Dynamic Range Electro-Optical Transfer Function of Mastering Reference Displays", http://standards.smpte.org/content/978-1-61482-829-7/st-2084-2014/SEC1.
Jacob Strom, Martin Pettersson, Jonatan Samuelsson, Kenneth Andersson, "Additional Results for m36184 for Color Correction", ISO/IEC (MPEG) document m36184, Warsaw, Poland, Jun. 2015.
A. Norkin, "Closed form HDR 4:2:0 chroma subsampling (HDR CE1 and AHG5 related)", ITU-T SG16 WP3 and ISO/IEC JTC1/SC29/WG11 document JCTVC-W0107, San Diego, CA, USA, Feb. 2016.
A. Norkin, "On closed form HDR 4:2:0 chroma subsampling (AHG13 related)", ITU-T SG16 WP3 and ISO/IEC JTC1/SC29/WG11 document JCTVC-X0072, Geneva, Switzerland, May 2016.
J. Ström, J. Samuelsson, K. Andersson, P. Hermansson, "Modified Linearization of Luma Adjustment", ITU-T SG16 WP3 and ISO/IEC JTC1/SC29/WG11 document JCTVC-X0036, Geneva, Switzerland, May 2016.
International Search Report for application No. PCT/US2018/054466 dated Jan. 7, 2019.
Norkin Andrey., "Fast Algorithm for HOR Color Conversion", 2016 Data Compression Conference (DCC), IEEE, Mar. 30, 2016, pp. 486-495.
Ström et al., "Luma Adjustment for High Dynamic Range Video", 2016 Data Compression Conference (DCC), IEEE, Mar. 30, 2016, pp. 319-328.
International Search Report for application No. PCT/US2018/054465 dated Jan. 7, 2019.
Ström, Jacob, "AHG on HDR and WCG: Multi-LUT Luma Adjustment Implementation", URL: HTTP://WFTP3.ITU.INT/AV-ARCH/JCTVC-SITE, Ericsson, Joint Collaborative Team on Video Coding (JCT-VC) of ITU-T SG 16 WP 3 and ISO/IEC JTC 1/SC 291WG 11, JCTVC-Y0030, 25th Meeting, Oct. 14-21, 2016, pp. 1-8.

\* cited by examiner

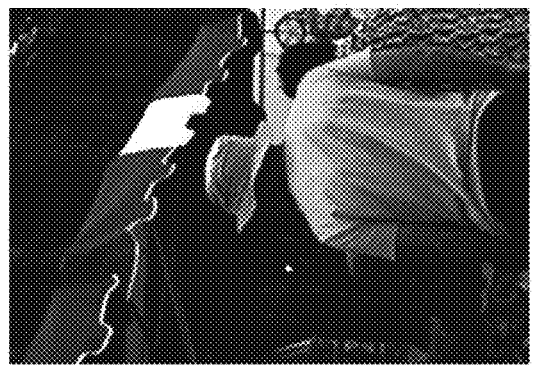
FIG. 6C (Linear Approximation of EOTF)
FIG. 6B (Direct Subsampling)
FIG. 6A (Original)

HIGH DYNAMIC RANGE COLOR CONVERSION CORRECTION

CROSS-REFERENCE TO RELATED APPLICATIONS

This application is a continuation-in-part of U.S. patent application titled, "HIGH DYNAMIC RANGE COLOR CONVERSION CORRECTION," filed on Jun. 10, 2016 and having Ser. No. 15/179,857, which claims the priority benefit of the U.S. Provisional Patent Application titled, "APPROACH FOR HIGH DYNAMIC RANGE COLOR CONVERSION," filed on Nov. 9, 2015 and having Ser. No. 62/253,098, and the U.S. Provisional Patent Application titled, "APPROACH FOR HIGH DYNAMIC RANGE COLOR CONVERSION," filed on Nov. 16, 2015 and having Ser. No. 62/256,080. This application also claims the priority benefit of the U.S. Provisional Patent Application titled, "HIGH DYNAMIC RANGE COLOR CONVERSION TECHNIQUES," filed on Oct. 5, 2016 and having Ser. No. 62/404,720. The subject matter of these related applications is hereby incorporated herein by reference.

BACKGROUND OF THE INVENTION

Field of the Invention

Embodiments of the present invention relate generally to audiovisual processing and, more particularly, to high dynamic range (HDR) color conversion correction.

Description of the Related Art

High Dynamic Range (HDR) imaging is a technique that enables a wider range of luminance values to be represented than is typically possible via conventional imaging techniques. In particular, conventional imaging equipment is capable of capturing and reproducing only a limited luminance range, commonly resulting in a loss of detail in the luminance ranges associated with shadows and/or highlights. By contrast, HDR techniques are capable of capturing and representing a luminance range that is closer to the range perceived by the human visual system. Consequently, HDR techniques are expected to significantly improve the visual quality of many types of multimedia content.

In order to represent the luminance values associated with HDR content (e.g., luminance values of approximately 0 to 10,000 cd/m$^2$) using moderate bit depths (e.g., 10 to 12 bits per sample), various standards apply a highly nonlinear transfer function to the HDR content. Bit depth generally refers to the number of bits used to represent one image component sample (e.g., a luma or chroma value). More specifically, because the human visual system is more sensitive to differences in luminance values when the luminance values are low, a nonlinear transfer function is commonly applied to linear color values (e.g., RGB values) associated with HDR content in order to allocate a greater number of values to the lower end of the luminance range. Allocating more values to the lower end of the luminance range allows quantization to be achieved at moderate bit depths without any perceptible artifacts from the perspective of the viewer.

After a nonlinear transfer function is applied to HDR content, the resulting nonlinear values are converted to a desired color space and further processed so that the HDR content can be transmitted and broadcast more efficiently. Those additional processing operations typically include chroma subsampling and video compression, each of which are performed to reduce the bitrate of the HDR content. For example, with respect to the HDR10 specification recently adopted by the Digital Entertainment Content Ecosystems (DECE), a ST.2084 nonlinear transfer function is applied to linear RGB values. The nonlinear R'G'B' values are then converted into the BT.2020 color space, and the resulting Y'CbCr 4:4:4 values are subsampled to generate Y'CbCr 4:2:0 values. The Y'CbCr 4:2:0 values are then compressed via High Efficiency Video Coding (HEVC) Main10 encoding to generate a compressed video stream.

One drawback of conventional HDR conversion processes is that, when color values (e.g., Y'CbCr 4:4:4 values) associated with HDR content are subsampled, the chroma values are subsampled by a process similar to averaging, for example by applying a low-pass filter and subsequently decimating samples (e.g., to generate Y'CbCr 4:2:2 values or Y'CbCr 4:2:0 values), but the luma values are not. When the HDR content is reconstructed, the averaged chroma values are upsampled and then combined with the original luma values. Thus, because the chroma values were modified in the first instance, when an inverse of the nonlinear transfer function is applied to the upsampled values, the reconstructed color values may be significantly different than the color values present in the original HDR content. These types of differences are most noticeable with color values that fall within regions of the nonlinear opto-electrical transfer function that have a steep slope (e.g., color components with low luminance values), since, in these regions, small variations in the value of a color component can have a significant impact on Y', Cb, and Cr values.

For example, if one color component has a value close to zero, while other color components have higher values—which is commonly the case for colors that are close to color gamut boundaries—then the low intensity color component value would have disproportionally high contribution to the resulting Y'CbCr 4:4:4 signal. That is, small variations in this low intensity color component value would result in significantly different values for the Y', Cb, and Cr components, despite the corresponding linear RGB values being similar. Consequently, when Y'CbCr 4:2:0 color values are later upsampled to Y'CbCr 4:4:4 color values and the inverse nonlinear transfer function is applied, changes in the Cb and/or Cr values due to subsampling may cause saturated colors to be reconstructed to significantly different values, producing artifacts in the final image.

One solution to the above problem is to iterate over different luma values to select a luma value that, when reconstructed (e.g., by upsampling Y'CbCr 4:2:0 color values to Y'CbCr 4:4:4 color values) results in a linear luminance that is closest to the linear luminance of the original signal. However, in order to select a luma value for a 10-bit signal, for example, this particular approach would require ten iterations to be performed for each luma sample. Because a single iteration requires an inverse nonlinear transfer function to be calculated and an inverse color transform to be applied, these types of conventional techniques can be very slow, even when the electro-optical transfer function is implemented as a look-up table.

Another drawback of conventional HDR conversion processes is that, when the subsampled color values (e.g., Y'CbCr 4:2:0 color values) are later upsampled (e.g., to Y'CbCr 4:4:4 color values) for display, the type of upsampling filter that is implemented by the decoder may be different than the type of downsampling filter that was implemented by the encoder. Consequently, the color values may be reconstructed in an inaccurate manner, leading to visual artifacts. Further, subsampled color values that are near the boundaries of a range of acceptable color values (e.g., 0 to 10,000 nits) may be reconstructed to generate color values that are outside of the acceptable range (e.g., below 0 nits or above 10,000 nits). As a result, the reconstructed color values may not be properly displayed.

As the foregoing illustrates, improved techniques for converting and correcting high dynamic range (HDR) color values would be useful.

SUMMARY OF THE INVENTION

One embodiment of the present invention sets forth a method for correcting color values. The method includes downsampling first color space values to generate downsampled color space values and upsampling the downsampled color space values via a first upsampling filter type to generate second color space values. The method further includes modifying at least one component value included in the downsampled color space values based on a first component value included in the first color space values, a second component value included in the second color space values, and an approximation of a nonlinear transfer function. The method further includes at least one of (i) storing an indication of the first upsampling filter type in conjunction with a video bitstream associated with the at least one component value, and (ii) transmitting the indication of the first upsampling filter type to a receiving device in conjunction with the video bitstream.

Further embodiments provide, among other things, a non-transitory computer-readable medium and a computing device configured to implement the method set forth above.

At least one advantage of the disclosed techniques is that the resulting reconstructed HDR images are more accurate relative to the original HDR images than images generated via conventional chroma downsampling. Additionally, the complexity of the disclosed techniques is significantly lower than that of the conventional approaches, enabling an optimal component value (e.g., a luma value) to be determined in real-time via fewer iterations (e.g., one or two iterations) than in conventional approaches. Further, because the type of filter applied during pre-processing of the HDR images can be signaled to a receiving device, the receiving device is able to account for the filter type and generate images that are more accurate relative to the original HDR images.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A and 6A are original HDR images, FIGS. 5B and 6B are images processed according to conventional techniques, and FIGS. 5C and 6C are images processed according to one or more embodiments of the present invention.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
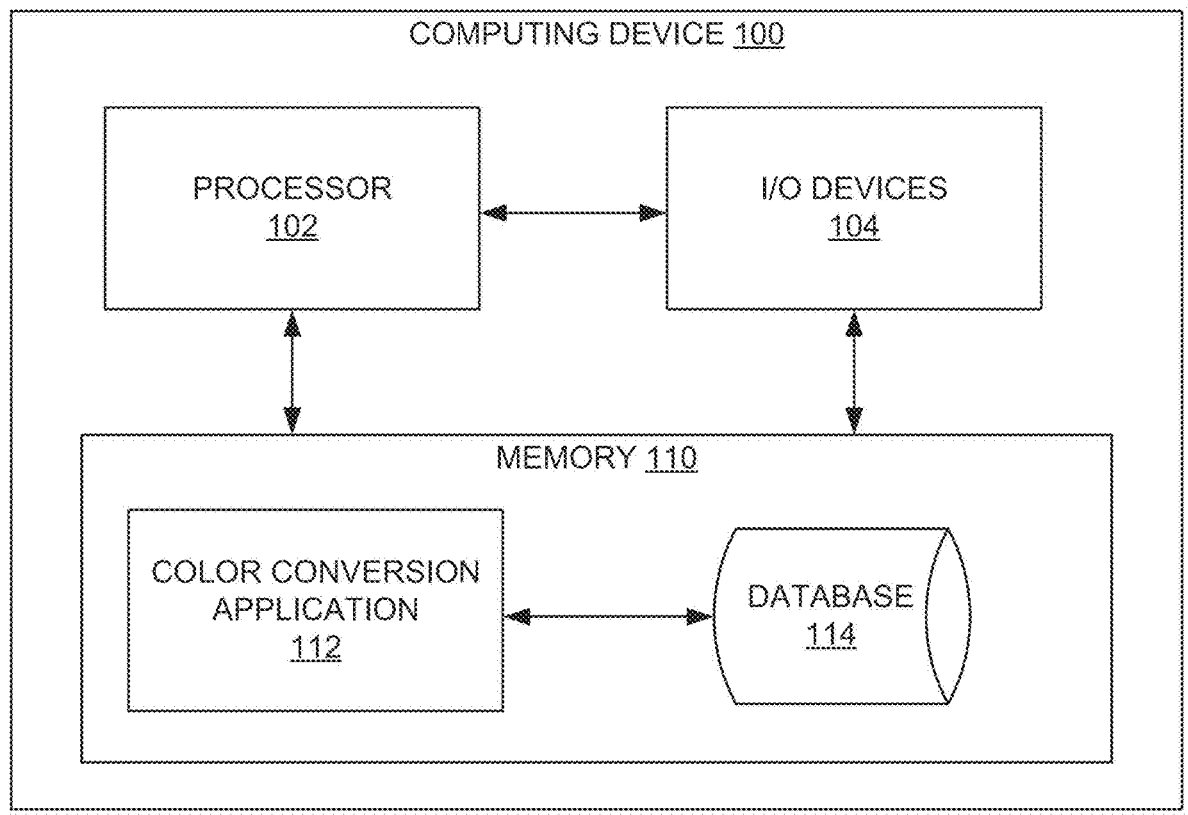
FIG. 1 is a conceptual illustration of a computing device configured to implement one or more aspects of the present invention.

FIG. 1 is a conceptual illustration of a computing device 100 configured to implement one or more aspects of the present invention. As shown, the color conversion system includes a computing device 100. The computing device 100 includes a processor 102, input/output (I/O) devices 104, and a memory 110. The memory 110 includes a color conversion application 112 configured to interact with a database 114.

The processor 102 may be any technically feasible form of processing device configured to process data and execute program code. The processor 102 could be, for example, and without limitation, a central processing unit (CPU), a graphics processing unit (GPU), an application-specific integrated circuit (ASIC), a digital signal processor (DSP), a field-programmable gate array (FPGA), and so forth.

Memory 110 may include a memory module or a collection of memory modules. The color conversion application 112 within memory 110 is executed by the processor 102 to implement the overall functionality of the color conversion system. For example, and without limitation, multimedia content (e.g., images, video, etc.) received by the color conversion system may be processed by the color conversion application 112 to apply linear and/or nonlinear transfer functions to the multimedia content, to convert the multimedia content between one or more color spaces, to perform downsampling, subsampling, upsampling, etc. on the multimedia content, and/or to apply one or more compression algorithms to the multimedia content. Database 114 within memory 110 may store images, video, algorithms, parameters, lookup tables, and/or other types of data associated with transfer functions, color spaces, lossy and/or lossless codecs, etc.

I/O devices 104 may include input devices, output devices, and devices capable of both receiving input and providing output. For example, and without limitation, I/O devices 104 could include wired and/or wireless communication devices that send data to and/or receive data from a camera, a display screen, a media player, a storage device, speakers, a microphone, a networking device, and/or another computing device.

Generally, computing device 100 is configured to coordinate the overall operation of the color conversion system. In other embodiments, the computing device 100 may be coupled to, but separate from other components of the color conversion system. However, the embodiments disclosed herein contemplate any technically feasible system configured to implement the functionality of the color conversion system.

Figure 2:
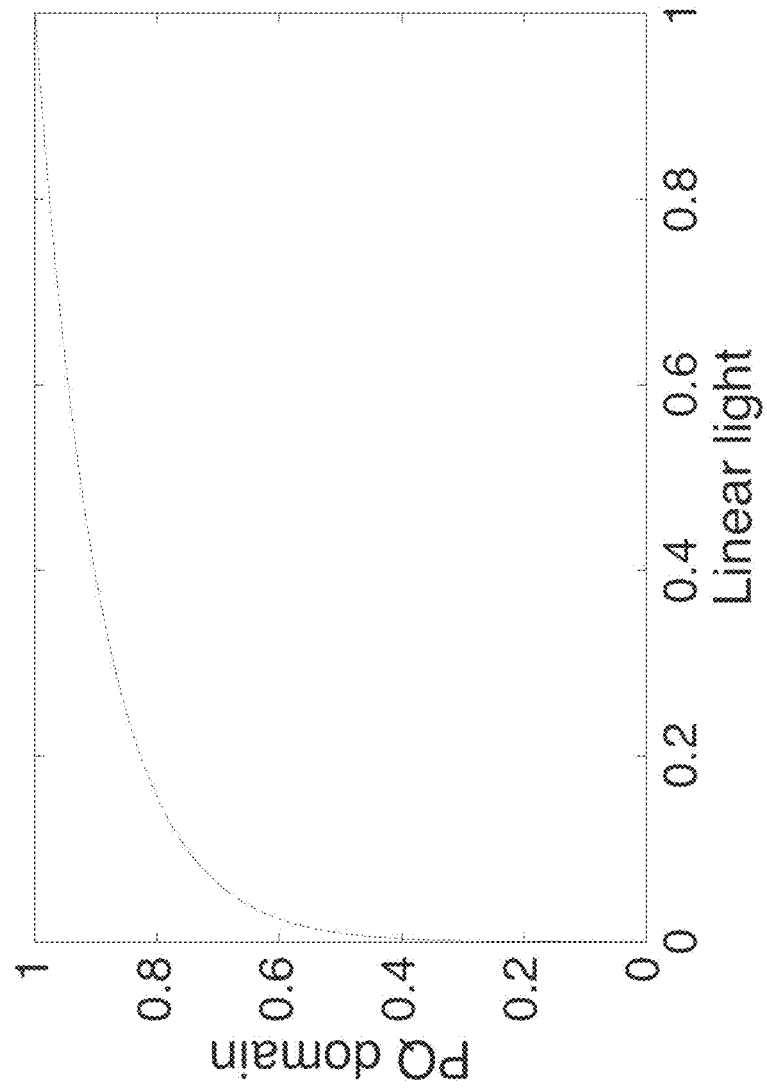
FIG. 2 illustrates a nonlinear opto-electrical transfer function (OETF) that can be implemented to convert linear light/color values to nonlinear light/color values, according to various embodiments of the present invention.

FIG. 2 illustrates a nonlinear opto-electrical transfer function (OETF) that can be implemented to convert linear light/color values to nonlinear light/color values, according to various embodiments of the present invention. As shown, the slope of the transfer function is steep in the low-luminance range and shallow in the high luminance range, since the human visual system is more sensitive to differences in luminance values when the luminance values are low. As a result, the nonlinear transfer function allocates more codewords and uses smaller quantization steps in the low luminance range, reducing the likelihood that quantization will produce visible artifacts in an image. Although the techniques disclosed herein are described in conjunction with the OETF shown in FIG. 2, in various embodiments, any other type of nonlinear transfer function having any shape may be implemented to convert and reconstruct linear color values.

Figure 3:
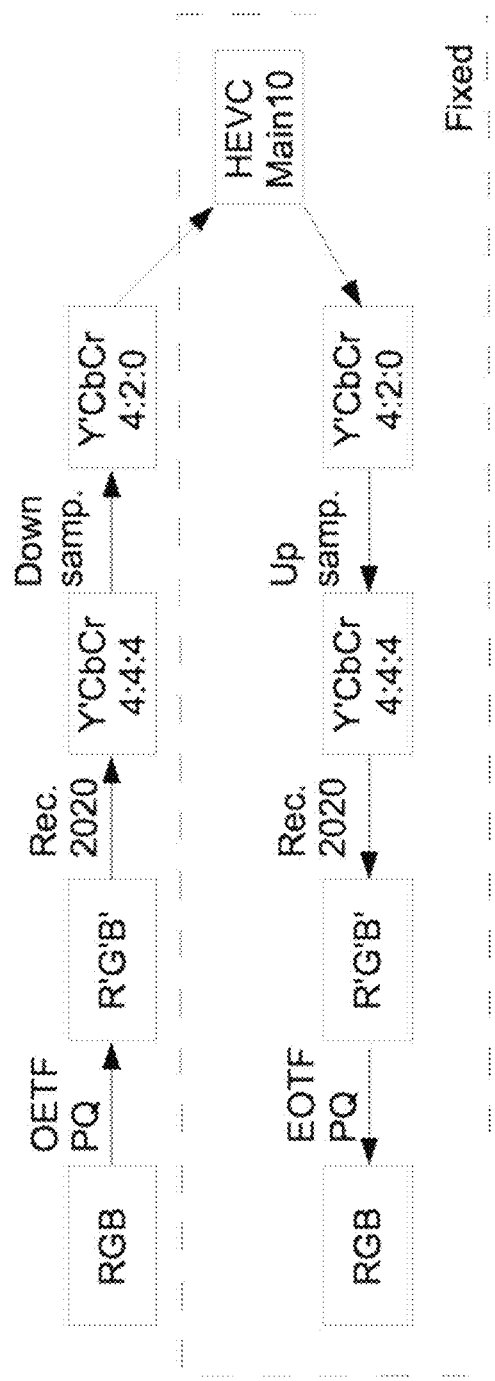
FIG. 3 illustrates a process for converting, compressing, and reconstructing high dynamic range (HDR) content, according to various embodiments of the present invention.

FIG. 3 illustrates a process for converting, compressing, and reconstructing HDR content, according to various embodiments of the present invention. As shown, a nonlinear transfer function is applied to the linear RGB values to generate nonlinear R'G'B' values. The nonlinear R'G'B' values are then converted to a desired color space, and the resulting color values are processed so that the HDR content can be transmitted and broadcast more efficiently.

For example, in some embodiments, nonlinear R'G'B' values are generated by applying the OETF perceptual quantizer (PQ) to each linear light R, G, and B component separately. Then, the nonlinear R'G'B' values are converted to the non-constant luminance BT.2020 color space according to Equation 1, shown below. Next, further processing may be performed on the Y'CbCr 4:4:4 color values, for example, to reduce the bitrate for ease of transmission.

$$Y'=0.2627R'+0.6780G'+0.0593B';$$

$$Cb=(B'-Y')/1.8814; Cr=(R'-Y')/1.4746; \quad (1)$$

In some embodiments, after the color values are converted to a particular color space, the color values are further processed via subsampling, such as chroma subsampling. When subsampling color values, luma and/or chroma information is averaged over adjacent pixels in order to reduce the bitrate of the processed images. Typically, the chroma components of the image are subsampled while retaining the original resolution of the luma components, since the human visual system is able to detect differences in luminance more readily than differences in color. Accordingly, as shown in FIG. 3, color values specified in a Y'CbCr 4:4:4 format may be subsampled to generate Y'CbCr 4:2:2 values or Y'CbCr 4:2:0 values. The resulting color values are then optionally compressed via a codec, such as HEVC, H.264, etc.

As noted above, one drawback of these conventional HDR conversion processes is that reconstructing the subsampled color values can produce artifacts. Notably, although applying an inverse of the color space transform and an inverse of the nonlinear transform function (e.g., an EOTF PQ) to the Y'CbCr 4:4:4 color values would result in reconstructed color values that are substantially the same as the original linear RGB signal, when subsampling is applied to the Y'CbCr 4:4:4 color values, the chroma values are effectively averaged. Consequently, when these downsampled chroma values are upsampled back to Y'CbCr 4:4:4 color values and the inverse of the nonlinear transfer function is applied to the upsampled values, the reconstructed color values may be significantly different than the color values present in the original linear RGB signal. Such artifacts are particularly noticeable in saturated colors, when one or more or color components (e.g. R, G, and/or B) have values close to zero, where small variations in a particular component value (e.g., R, G, or B) can result in significantly different Y', Cb, and Cr component values, despite each of the linear light RGB values being similar. An example of such artifacts are shown in FIGS. 5B and 6B, each of which includes detail that was not present in the original images, shown in FIGS. 5A and 6A.

Accordingly, in various embodiments, in order to reduce the occurrence and/or visibility of artifacts, the color conversion application 112 adjusts one or more of the downsampled component values such that the values, when upsampled and reconstructed, produce color values that are similar to the color values present in the original HDR content. More specifically, the color conversion application 112 downsamples chroma values. In some embodiments, the color conversion application 112 can obtain downsampled chroma directly from Y'CbCr 4:4:4 color values, as shown in FIG. 3. Alternatively, the color conversion application 112 may downsample the linear RGB color values directly and then apply the OETF PQ and color transform to the downsampled values.

After obtaining the downsampled chroma, the color conversion application 112 upsamples the chroma by applying a selected upsampling filter. The color conversion application 112 then modifies one or more of the Y', Cb, and Cr values such that reconstructing these values to a linear RGB signal produces color values similar to the color values present in the original linear RGB signal. For reference, an example of an EOTF PQ that may be used to reconstruct linear RGB values from nonlinear R'G'B' values is shown below in Equation 2.

$$PQ\_TF(L) = \left(\frac{c_1 + c_2 L^{m_1}}{1 + c_3 L^{m_1}}\right)^{m_2}; m_1 = 0.1593017578125, \quad (2)$$

$$m_2 = 78.84375, c_1 = 0.8359375, c_2 = 18.8515625,$$

$$c_3 = 18.6875.$$

In some embodiments, the color conversion application 112 modifies the Y', Cb, and Cr values by estimating each of the Y', Cb, and Cr values simultaneously. In other embodiments, in order to obtain a faster estimation, the value of Y' may be obtained while keeping the values of Cb and Cr constant. This latter approach may be beneficial because the filter used to upsample the chroma components is not defined by a standard and, thus, may vary across different hardware and software platforms. Moreover, depending on which upsampling filter is used, modifying a chroma sample may also change the upsampled chroma values at neighboring locations.

Accordingly, in various embodiments, the color conversion application 112 determines a value of the luma component Y'(x, y) by finding new Y', Cb, and Cr component values which correspond to $RGB_{new}(x,y)$ values that are substantially similar to the original $RGB_{org}(x, y)$ values. In this notation, x and y are horizontal and vertical positions of the sample, respectively.

EXAMPLE 1

First Cost Function

In some embodiments, the distance (D) between $RGB_{new}(x,y)$ and $RGB_{org}(x, y)$ could be measured as the Euclidean norm (e.g., the squared error for each component):

$$D=(R_{new}(x,y)-R_{org}(x,y))^2+(G_{new}(x,y)-G_{org}(x,y))^2+ \\ (B_{new}(x,y)-B_{org}(x,y))^2 \quad (3)$$

Omitting sample coordinates for simpler notation, the cost function is as follows:

$$D=(R_{new}-R_{org})^2+(G_{new}-G_{org})^2+(B_{new}-B_{org})^2 \quad (4)$$

In a more general case, we can also weight the importance of each color component R, G and B with a weighting factor $w_X$, where X corresponds to a color component, $w_R$, $w_G$, and $w_B$. Then, our cost function would take a form of Equation 5 or Equation 6, where f is the EOTF function, such as the ST.2084 EOTF PQ.:

$$D=w_R(R_{new}-R_{org})^2+w_G(G_{new}-G_{org})^2+w_B(B_{new}-B_{org})^2 \quad (5)$$

$$D=w_R(f(R'_{new})-f(R'_{org}))^2+w_G(f(G'_{new})-f(G'_{org}))^2+w_B(f(B'_{new})-f(B'_{org}))^2 \quad (6)$$

The values R', G' and B' can be obtained from the original Y'CbCr values by applying an inverse color transform, which depends on the color space associated with the Y'CbCr values. For example, an inverse color transform for Y'CbCr values within the BT.709 and BT.2020 color spaces has the following form:

$$\begin{pmatrix} R' \\ G' \\ B' \end{pmatrix} = \begin{pmatrix} a_{1,1} & a_{1,2} & a_{1,3} \\ a_{2,1} & a_{2,2} & a_{2,3} \\ a_{3,1} & a_{3,2} & a_{3,3} \end{pmatrix} \begin{pmatrix} Y' \\ Cb \\ Cr \end{pmatrix} \quad (7)$$

Attempting to minimize the cost function D for an EOTF with a complex expression, such as ST.2084, requires significant processing resources. Consequently, the EOTF may be approximated using a truncated Taylor series (e.g., the first, second, or third degree polynomials), enabling the cost function D to be minimized via a closed form solution. Two examples of closed form solutions for minimizing the cost function D shown in Equations 3-6 are described below in conjunctions with Equations 8-17. Notably, although the techniques described below implement RGB values, color spaces other than RGB can also be used.

Linear Approximation of EOTF (First Cost Function)

In order to obtain a closed form, one-step solution for estimating a better luma component Y'(x, y) that corresponds to $RGB_{new}(x,y)$ values that are substantially similar to the original $RGB_{org}(x, y)$ values, the EOTF f(X) could be approximated with a first degree polynomial, where the $f(X_i)$ is the value of the derivative of the f(X') with respect to X at point $X_i$:

$$f(X_i+\Delta)=f(X_i)+f'(X_i)\Delta \quad (8)$$

Then, by substituting the EOTF approximation of Equation 8 into Equation 6, the cost function could be approximated as:

$$D=w_R(f'(R'_{org})\Delta_R)^2+w_G(f'(G'_{org})\Delta_G)^2+w_B(f'(B'_{org})\Delta_B)^2 \quad (9)$$

Next, $\Delta_R$ in Equation 9 is substituted with $(a_{1,1}Y'_{new}+e_R)$—based on the inverse color transform—and similar substitutions are made for $\Delta_G$ and $\Delta_B$. The cost function D is then differentiated with respect to Y' to find a closed form solution for the local minimum. This closed form solution for the value of Y' can be obtained as follows. First, we calculate $e_R$, $e_G$, and $e_B$ based on the new chroma values, the original chroma values, and the inverse color transform parameters:

$$e_R=-Y'_{org}a_{1,1}+(Cb_{new}-Cb_{org})a_{1,2}+(Cr_{new}-Cr_{org})a_{1,3},$$

$$e_G=-Y'_{org}a_{2,1}+(Cb_{new}-Cb_{org})a_{2,2}+(Cr_{new}-Cr_{org})a_{2,3},$$

$$e_B=-Y'_{org}a_{3,1}+(Cb_{new}-Cb_{org})a_{3,2}+(Cr_{new}-Cr_{org})a_{3,3}, \quad (10)$$

The value of Y' is then equal to:

$$Y'_{new}=-\frac{w_Rf'(R'_{org})^2e_Ra_{1,1}+w_Gf'(G'_{org})^2e_Ga_{2,1}+w_Bf'(B'_{org})^2e_Ba_{3,1}}{w_Rf'(R'_{org})^2a_{1,1}^2+w_Gf'(G'_{org})^2a_{2,1}^2+w_Bf'(B'_{org})^2a_{3,1}^2} \quad (11)$$

When $a_{1,1}=a_{2,1}=a_{3,1}=1$, as in BT.709 and BT.2020, the expression simplifies to:

$$Y'_{new}=-\frac{w_Rf'(R'_{org})^2e_R+w_Gf'(G'_{org})^2e_G+w_Bf'(B'_{org})^2e_B}{w_Rf'(R'_{org})^2+w_Gf'(G'_{org})^2+w_Bf'(B'_{org})^2} \quad (12)$$

Further, if all of the weights are set equal to 1, then Y' can be found as follows:

$$Y'_{new}=-\frac{f'(R'_{org})^2e_R+f'(G'_{org})^2e_G+f'(B'_{org})^2e_B}{f'(R'_{org})^2+f'(G'_{org})^2+f'(B'_{org})^2} \quad (13)$$

In some embodiments, values of the EOTF derivative squared $f'(X)^2$ can be pre-computed and stored in a look-up table. In particular, for a video with bit depth of 10, a look-up table with 1024 entries could be used when the fixed point processing of 10 bits is used. In case of a higher fixed point or floating point precision, more table entries could be used to improve accuracy.

Resolving Clipping with Linear Approximation of EOTF (First Cost Function)

In some color spaces, such as BT.709 and BT.2020, R, G, and B color components are required to be within a certain interval range. For example, in the case of floating point operations, R, G, and B color components are typically required to be within the (0, 1) interval. Additionally, in the case of integer representations of color components, an appropriate integer range may be implemented such that the signal is quantized. For example, if 10-bit color components are implemented, then R, G, and B color components would be required to be integers within the 0 to 1023 range.

The embodiments discussed below are described in conjunction with a floating point range of (0,1). However, these techniques can be implemented with color components values associated with any range, including integer ranges, floating point ranges, fixed point ranges, etc.

Figure 4:
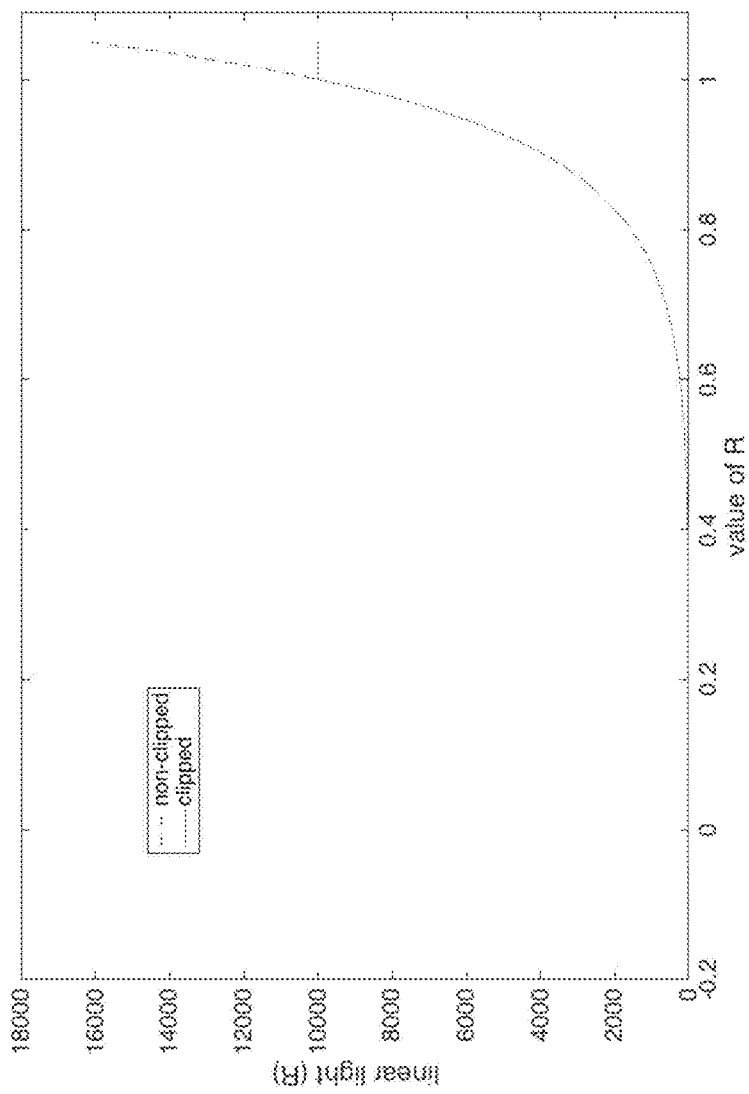
FIG. 4 illustrates a mapping of R' component values to linear light in the ST.2084 transfer function and non-constant luminance, according to various embodiments of the present invention.

FIG. 4 illustrates a mapping of R' component values to linear light in the ST.2084 transfer function and non-constant luminance, according to various embodiments of the present invention. As shown, R' component values are clipped below zero and at levels above 10,000 nits. However, Equations 1-13 described above assume that R', G', and B' values continue above 10,000 nits and below 0 nits. For example, the linear approximation indicated by the dashed line in FIG. 4 assumes that R', G', and B' values continue above 10,000 nits. Because such approximations may fall outside of the acceptable range of color component values, a mismatch may exist between the calculated value of a color component and the real value of the color component, after clipping is applied. For example, if the calculated value(s) of one or more color components are outside of an acceptable range (e.g., 0 to 1 or 0 to 1023), then the color component value(s) may be clipped by a display device or decoder, creating visual artifacts in the resulting image. Such a mismatch between the calculated value of an R' color component and the real value of the R' color component is shown by the solid line in FIG. 4.

Accordingly, in various embodiments, after $Y'_{new}$ is obtained using Equation 12, $R'_{new}$, $G'_{new}$, and $B'_{new}$ are calculated according to Equation 7. $R'_{new}$, $G'_{new}$, and $B'_{new}$ are then compared to the maximum and/or minimum of a color component range (e.g., 0 and 1), as shown in Equation 14. If $R'_{new}$, $G'_{new}$, or $B'_{new}$ are outside of the color component range, then the value of $Y'_{new}$ is calculated according to Equation 14 to take into account the color components having clipped values. In particular, as shown in Equation 14, when the value of a color component is clipped, the corresponding terms in Equations 6 and 9 do not depend on the value of Y', since the value of this component is equal to 1 or 0, which is the smallest or the highest value of the range. Therefore, the derivatives of these terms with respect to Y' are equal to zero, and the terms that correspond to those color components can be removed from the final equation for computing $Y'_{new}$.

$$Y'_{new} = \frac{z_R w_R f'(R'_{org})^2 e_R + z_G w_G f'(G'_{org})^2 e_G + z_B w_B f'(B'_{org})^2 e_B}{z_R w_R f'(R'_{org})^2 + z_G w_G f'(G'_{org})^2 + z_B w_B f'(B'_{org})^2} \quad (14)$$

where, $$z_R = \begin{cases} 0, & \text{if } R'_{new} > 1 \\ 0, & \text{if } R'_{new} < 0 \\ 1, & \text{otherwise} \end{cases}$$

$$z_G = \begin{cases} 0, & \text{if } G'_{new} > 1 \\ 0, & \text{if } G'_{new} < 0 \\ 1, & \text{otherwise} \end{cases}$$

$$z_B = \begin{cases} 0, & \text{if } B'_{new} > 1 \\ 0, & \text{if } B'_{new} < 0 \\ 1, & \text{otherwise} \end{cases}$$

Alternatively, the $R'_{new}$, $G'_{new}$, or $B'_{new}$ values could be compared only to the upper end of the color component range (e.g., 1), since color component values below 0 tend to have a negligible effect on the resulting Y' value. In such embodiments, the value of $Y'_{new}$ could be calculated according to Equation 16 to take into account the color components that are being clipped at the upper end of the range of color component values.

$$Y'_{new} = \frac{z_R w_R f'(R'_{org})^2 e_R + z_G w_G f'(G'_{org})^2 e_G + z_B w_B f'(B'_{org})^2 e_B}{z_R w_R f'(R'_{org})^2 + z_G w_G f'(G'_{org})^2 + z_B w_B f'(B'_{org})^2} \quad (15)$$

where, $$z_R = \begin{cases} 0, & \text{if } R'_{new} > 1 \\ 1, & \text{otherwise} \end{cases}$$

$$z_G = \begin{cases} 0, & \text{if } G'_{new} > 1 \\ 1, & \text{otherwise} \end{cases}$$

$$z_B = \begin{cases} 0, & \text{if } B'_{new} > 1 \\ 1, & \text{otherwise} \end{cases}$$

In various embodiments, the following computer code could be implemented to resolve clipping with respect to both a lower end (e.g., 0) and an upper end (e.g., 1) of a color component range.

```
er = -y + (newCr - cr)*1.57480;
eg = -y - 0.18733 *(newCb - cb) - 0.46813 * (newCr - cr);
eb = -y + (newCb - cb)*1.85563 ;
wr = 1;
wg = 1;
wb = 1;
 newY = - ( r_deriv^2*er*wr^2 + g_deriv^2*eg*wg^2 +
b_deriv^2*eb*wb^2 ) / ( r_deriv^2*wr^2 + g_deriv^2*wg^2 +
b_deriv^2*wb^2 );
newr = newY + (newCr-0.5)*1.57480;
newg = newY - 0.18733 *(newCb -0.5) - 0.46813 * (newCr -0.5);
newb = newY + (newCb-0.5)*1.85563 ;
if ( (newr > 1) | | (newg> 1) | | (newb > 1 ) | | (newr < 0 ) | |
 (newg < 0) | | (newb < 0))
    numerator = 0;
    denominator = 0;
    if (newr > 1) | | (newr < 0 )
        numerator = numerator;
    else
        numerator = numerator + r_deriv^2*er*wr;
        denominator = denominator + r_deriv^2*wr;
    end
    if (newg > 1) | | (newg < 0 )
        numerator = numerator;
    else
        numerator = numerator + g_deriv^2*eg*wg;
        denominator = denominator + g_deriv^2*wg;
    end
     if (newb > 1) | | (newb < 0 )
        numerator = numerator;
    else
        numerator = numerator + b_deriv^2*eb*wb;
        denominator = denominator + b_deriv^2*wb;
     end
    if (denominator ~= 0 )
        newY = - numerator / denominator;
    end
end
```

Additionally, in various embodiments, the following computer code could be implemented to resolve clipping with respect to only an upper end (e.g., 1) of a color component range.

```
er = -y + (newCr - cr)*1.57480;
eg = -y - 0.18733 *(newCb - cb) - 0.46813 * (newCr - cr);
eb = -y + (newCb - cb)*1.85563 ;
wr = 1;
wg = 1;
wb = 1;
 newY = - ( r_deriv^2*er*wr^2 + g_deriv^2*eg*wg^2 +
b_deriv^2*eb*wb^2 ) / ( r_deriv^2*wr^2 + g_deriv^2*wg^2 +
b_deriv^2*wb^2 );
newr = newY + (newCr-0.5)*1.57480;
newg = newY - 0.18733 *(newCb -0.5) - 0.46813 * (newCr -0.5);
newb = newY + (newCb-0.5)*1.85563 ;
if ( (newr > 1) || (newg> 1) || (newb > 1 ))
    numerator = 0;
    denominator = 0;
    if (newr > 1)
        numerator = numerator;
    else
        numerator = numerator + r_deriv^2*er*wr;
        denominator = denominator + r_deriv^2*wr;
    end
```

```
    if (newg > 1)
        numerator = numerator;
    else
        numerator = numerator + g_deriv^2*eg*wg;
        denominator = denominator + g_deriv^2*wg;
    end
    if (newb > 1)
        numerator = numerator;
    else
        numerator = numerator + b_deriv^2*eb*wb;
        denominator = denominator + b_deriv^2*wb;
    end
    if (denominator ~= 0 )
        newY = - numerator / denominator;
    end
end
```

Second Degree Approximation of EOTF (First Cost Function)

Alternatively, the EOTF could be approximated using a second degree polynomial, as shown in Equation 16:

$$f(X_i+\Delta)=f(X_i)+f'(X_i)\Delta+f''(X_i)\Delta^2/2 \quad (16)$$

The resulting approximation is closer to the real EOTF than a linear approximation. However, finding local minima of the cost function D requires finding roots of a cubic equation, which involves more complexity and processing resources as compared to the linear approximation discussed above.

With respect to the second degree approximation, the derivations may be performed in a similar manner to the linear approximation and are omitted for brevity. The solution, assuming $a_{1,1}=a_{2,1}=a_{3,1}=1$, is as follows:

$$e_R=-Y'_{org}+(Cb_{new}-Cb_{org})a_{1,2}+(Cr_{new}-Cr_{org})a_{1,3},$$

$$e_G=-Y'_{org}+(Cb_{new}-Cb_{org})a_{2,2}+(Cr_{new}-Cr_{org})a_{2,3},$$

$$e_B=-Y'_{org}+(Cb_{new}-Cb_{org})a_{3,2}+(Cr_{new}-Cr_{org})a_{3,3} \quad (17)$$

Then:

$$T_{3,X}=f'(X)^2,$$

$$T_{2,X}=3f'(X)f''(X)+3f'(X)^2 e_X,$$

$$T_{1,X}=2f'(X)^2+6f'(X)f''(X)e_X+3f'(X)^2(e_X)^2,$$

$$T_{0,X}=2f'(X)^2 e_X+3f'(X)f''(X)(e_X)^2+f'(X)^2(e_X)^3, \quad (18)$$

where X stands for R, G, and B, and f'(X) stands for the first derivative $f'(R'_{org})$, $f'(G'_{org})$, or $f'(B'_{org})$, and f''(X) stands for the second derivative $f''(R'_{org})$, $f''(G'_{org})$, or $f''(B'_{org})$. The derivatives are taken with respect to the corresponding non-linear color component.

In order to minimize the cost function D, the cubic equation below is solved with respect to $Y'_{new}$:

$$(w_R T_{3,R}+w_G T_{3,G}+w_B T_{3,B})(Y_{new})^3+(w_R T_{2,R}+w_G T_{2,G}+w_B T_{2,B})(Y_{new})^2+(w_R T_{1,R}+w_G T_{1,G}+w_B T_{1,B})Y_{new}+(w_R T_{0,R}+w_G T_{0,G}+w_B T_{0,B})=0 \quad (19)$$

The cubic equation has either one or three real roots. In the case of three real roots, the minimum is achieved in either the root having the largest value or the smallest value, due to the fact that the cost function D is quadratic with a positive coefficient at the fourth degree term. The values of the cost function D are then calculated for both roots, and the root resulting in a smaller value is chosen as $Y'_{new}$.

If Equation 3 has only one real root, then the real part of the two complex roots may still be considered as a possible solution. Specifically, because an approximation of an EOTF is used, small changes in values of the equation terms can result in Equation 19 having only one real root instead of three real roots. However, in some cases, when two real roots—one of which would result in the cost function minimum—become two complex roots, the real part of the pair of complex roots represents a better approximation of the solution than the value of the remaining real root.

EXAMPLE 2

Second Cost Function

In some embodiments, the distance (D) could be measured as a sum of weighted differences between individual R, G, and B components of $RGB_{new}(x,y)$ and $RGB_{org}(x, y)$. In such embodiments, the difference between the two values could be calculated according to Equation 20, where $w_R$, $w_G$, and $w_B$ are the weights corresponding to each color component and R, G, and B.

$$D=w_R(R_{new}(x,y)-R_{org}(x,y))+w_G(G_{new}(x,y)-G_{org}(x,y))+w_B(B_{new}(x,y)-B_{org}(x,y)) \quad (20)$$

Then, after omitting pixel coordinates for a simpler notation, the cost function is defined by Equation 21 or Equation 22, where f(X) is the EOTF function:

$$D=w_R(R_{new}-R_{org})+w_G(G_{new}-G_{org})+w_B(B_{new}-B_{org}) \quad (21)$$

$$D=w_R(f(R'_{new})-f(R'_{org}))+w_G(f(G'_{new})-f(G'_{org}))+w_B(f(B'_{new})-f(B'_{org})) \quad (22)$$

As noted above, the transfer function domain values R', G', and B' can then be obtained from Y'CbCr by applying an inverse color transform, such as the BT.709 and BT.2020 transform:

$$\begin{pmatrix} R' \\ G' \\ B' \end{pmatrix} = \begin{pmatrix} a_{1,1} & a_{1,2} & a_{1,3} \\ a_{2,1} & a_{2,2} & a_{2,3} \\ a_{3,1} & a_{3,2} & a_{3,3} \end{pmatrix} \begin{pmatrix} Y' \\ Cb \\ Cr \end{pmatrix} \quad (23)$$

In various embodiments, the absolute value of the cost function D (i.e., |D|) shown in Equations 20-22 may be minimized in order to minimize the difference between $RGB_{new}(x,y)$ and $RGB_{org}(x,y)$. However, minimizing the absolute value of D is a non-trivial task, since the absolute value function is not differentiable at 0. Accordingly, in some embodiments, the function $D^2$ is instead minimized, since |D| and $D^2$ reach the minimum at the same point, and the function $D^2$ is differentiable on the entire range of real numbers R. Therefore, the optimization is instead performed for function $D_1$:

$$D_1=(w_R(f(R'_{new})-f(R'_{org}))+w_G(f(G'_{new})-f(G'_{org}))+w_B(f(B'_{new})-f(B'_{org})))^2 \quad (24)$$

Next, the EOTF is approximated with a truncated Taylor series in order to find a closed form solution to minimizing the cost function $D_1$.

Linear Approximation of EOTF (Second Cost Function)

Substituting (8) into (24), the cost function can be approximated as follows:

$$D=(w_R f'(R'_{org})\Delta_R+w_G f'(G'_{org})\Delta_G+w_B f'(B'_{org})\Delta_B)^2 \quad (25)$$

Then, $\Delta_R$ in Equation 25 is substituted with $(a_{1,1}Y'_{new}+e_R)$ and similar substitutions are made for $\Delta_G$ and $\Delta_B$. The cost function D is then differentiated with respect to Y' to find a closed form solution for the local minimum. To find a closed form solution for the value of Y', we first calculate $e_R$, $e_G$, and $e_B$ according to Equation 10. The value of Y' is equal to:

$$Y'_{new} = -\frac{w_R f'(R'_{org})e_R + w_G f'(G'_{org})e_G + w_B f'(B'_{org})e_B}{w_R f'(R'_{org})a_{1,1} + w_G f'(G'_{org})a_{2,1} + w_B f'(B'_{org})a_{3,1}} \quad (26)$$

When $a_{1,1}=a_{2,1}=a_{3,1}=1$, as in BT.709 and BT.2020, the expression simplifies to:

$$Y'_{new} = -\frac{w_R f'(R'_{org})e_R + w_G f'(G'_{org})e_G + w_B f'(B'_{org})e_B}{w_R f'(R'_{org}) + w_G f'(G'_{org}) + w_B f'(B'_{org})} \quad (27)$$

In some embodiments, values of the EOTF derivative f'(X) can be pre-computed and stored in a look-up table (e.g., a table having 1024 entries for video with a bit depth of 10 when the fixed point processing of 10 bits is used). In case of a higher fixed point or floating point precision, more table entries could be used to improve accuracy.

Resolving Clipping with Linear Approximation of EOTF (Second Cost Function)

As noted above, in many color spaces, R, G, and B color components are required to be within a certain interval range, such as (0,1) in the case of floating point operations. Consequently, if color component values are outside of the range of acceptable color values, then Equations 28 or 29 may be implemented to adjust the resulting Y' value.

In various embodiments, after $Y'_{new}$ is obtained using Equation 27, $R'_{new}$, $G'_{new}$, and $B'_{new}$ are calculated according to Equation 23. $R'_{new}$, $G'_{new}$, and $B'_{new}$ are then compared to the maximum and/or minimum of a color component range (e.g., 0 and 1), as shown in Equation 28. If $R'_{new}$, $G'_{new}$, or $B'_{new}$ are outside of the color component range, then the value of $Y'_{new}$ is calculated according to Equation 28 to take into account the color components having clipped values. In particular, as shown in Equation 28, when the value of a color component is clipped, the corresponding terms in Equations 22 and 25 do not depend on the value of Y', since the value of this component is equal to 1 or 0, which is the smallest or the highest value of the range. Therefore, the derivatives of these terms with respect to Y' are equal to zero, and the terms that correspond to those color components can be removed from the final equation for computing $Y'_{new}$.

$$Y'_{new} = \frac{z_R w_R f'(R'_{org})e_R + z_G w_G f'(G'_{org})e_G + z_B w_B f'(B'_{org})e_B}{z_R w_R f'(R'_{org}) + z_G w_G f'(G'_{org}) + z_B w_B f'(B'_{org})} \quad (28)$$

where, $$z_R = \begin{cases} 0, & \text{if } R'_{new} > 1 \\ 0, & \text{if } R'_{new} < 0 \\ 1, & \text{otherwise} \end{cases}$$

$$z_G = \begin{cases} 0, & \text{if } G'_{new} > 1 \\ 0, & \text{if } G'_{new} < 0 \\ 1, & \text{otherwise} \end{cases}$$

$$z_B = \begin{cases} 0, & \text{if } B'_{new} > 1 \\ 0, & \text{if } B'_{new} < 0 \\ 1, & \text{otherwise} \end{cases}$$

Alternatively, the $R'_{new}$, $G'_{new}$, or $B'_{new}$ values could be compared only to the upper end of the color component range (e.g., 1), since color components values below 0 tend to have a negligible effect on the resulting Y' value. In such embodiments, the value of $Y'_{new}$ could be calculated according to Equation 29 to take into account the color components that are being clipped at the upper end of the range of color component values.

$$Y'_{new} = \frac{z_R w_R f'(R'_{org})e_R + z_G w_G f'(G'_{org})e_G + z_B w_B f'(B'_{org})e_B}{z_R w_R f'(R'_{org}) + z_G w_G f'(G'_{org}) + z_B w_B f'(B'_{org})} \quad (29)$$

where, $$z_R = \begin{cases} 0, & \text{if } R'_{new} > 1 \\ 1, & \text{otherwise} \end{cases}$$

$$z_G = \begin{cases} 0, & \text{if } G'_{new} > 1 \\ 1, & \text{otherwise} \end{cases}$$

$$z_B = \begin{cases} 0, & \text{if } B'_{new} > 1 \\ 1, & \text{otherwise} \end{cases}$$

Second Degree Approximation of EOTF (Second Cost Function)

Alternatively, the EOTF could be approximated using a second degree polynomial, as shown in Equation 16. Then, the solution, assuming $a_{1,1}=a_{2,1}=a_{3,1}=1$, is as follows:

$e_R=-Y'_{org}+(Cb_{new}-Cb_{org})a_{1,2}+(Cr_{new}-Cr_{org})a_{1,3}$, $e_G=-Y'_{org}+(Cb_{new}-Cb_{org})a_{2,2}+(Cr_{new}-Cr_{org})a_{2,3}$, $e_B=-Y'_{org}+(Cb_{new}-Cb_{org})a_{3,2}+(Cr_{new}-Cr_{org})a_{3,3}$ (30)

Then:

$a=w_R f'(R'_{org})+w_G f'(G'_{org})+w_B f'(B'_{org})$, $c=e_R w_R f'(R'_{org})+e_G w_G f'(G'_{org})+e_B w_B f'(B'_{org})$, $m_2=w_R f''(R'_{org})+w_G f''(G'_{org})+w_B f''(B'_{org})$ $m_1=a+e_R w_R f''(R'_{org})+e_G w_G f''(G'_{org})+e_B w_B f''(B'_{org})$ $m_0=2c+(e_R)^2 w_R f''(R'_{org})+(e_G)^2 w_G f''(G'_{org})+(e_B)^2 w_B f''(B'_{org})$, (31)

where X stands for R, G, and B, and f'(X) stands for the first derivative f'($R'_{org}$), f'($G'_{org}$), or f'($B'_{org}$), and f''(X) stands for the second derivative f''($R'_{org}$), f''($G'_{org}$), or f''($B'_{org}$).

In order to minimize the cost function D, the cubic equation below is solved with respect to $Y'_{new}$:

$(m_2)^2(Y_{new})^3+3m_2 m_1(Y_{new})^2+(2(m_1)^2+m_2 m_0)Y_{new}+(m_0 n_0)=0$ (32)

As discussed above, the cubic equation has either one or three real roots. If three real roots are determined, then the minimum is achieved in either the root having the largest value or the smallest value. The values of cost function D are then calculated for both real roots, and the real root resulting in a smaller value is chosen as $Y'_{new}$. In case Equation 32 has only one real root, the real part of the remaining complex roots may be considered as a solution.

In other embodiments, any of the techniques described above can be implemented with other types of transfer functions, including ST.2084 or BT.1886. Additionally, the techniques described above can be applied to other color spaces, such as BT.709 and BT.2020. Further, in some embodiments, the derivative of an EOTF can be obtained either by differentiating the EOTF or by numerically approximating the EOTF, for example, using the definition of a derivative (e.g., dividing a change in the value of the EOTF by a change in the EOTF argument). An average or a weighted average of two or more of EOTF could also be implemented in the closed form solutions—instead of a single EOTF—in order to optimize the approach for compatibility with several transfer functions. In such embodiments, the derivatives of the EOTFs could be replaced with an average or a weighted average (e.g., a weighted sum) of the derivatives of the EOTFs.

The techniques described herein could also use higher order polynomials to approximate an EOTF. In addition, in some embodiments, the cost function D could be minimized with respect to several values (e.g., Y', Cb, and Cr), such as several values that correspond to neighboring pixels. In such embodiments, partial derivatives could be taken with respect to each Y', Cb, and Cr component to find the optimal values of Y', Cb, and Cr.

In various embodiments, the weights $w_R$, $w_G$, and $w_B$ could be chosen based on the desired precision or importance of each color component. For example, the weights could be set equal to 1. In some embodiments, the weights $w_R$, $w_G$, and $w_B$ are chosen on a picture basis or a sequence basis. The weights $w_R$, $w_G$ and $w_B$ could also be set adaptively on a sample/pixel basis, for example, based on the original R, G, and B values for each sample (e.g., based on an inverse relationship with the intensity of R, G, and B for each sample) or based on some other algorithm. In other embodiments, the weights could be set based on the contribution of each color component to the luminance. For example, the weights could be set equal to the contributions of the R, G, and B, components, respectively, to the Y component of the XYZ color space. In the case of BT.709, weights of 0.212639, 0.715169, and 0.072192 could be assigned to $w_R$, $w_G$, and $w_B$, respectively. In the case of BT.2020, weights of 0.262700, 0.677998, and 0.059302 could be assigned to $w_R$, $w_G$, and $w_B$, respectively.

Resolving a Mismatch Between Upsampling Filters

The algorithms described herein are able to efficiently improve the quality of HDR video when subsampling (e.g., chroma subsampling) is applied. However, if, during reconstruction, a decoder or other type of display equipment applies a different type of upsampling filter than the type of upsampling filter used to pre-process the video (e.g., as performed with respect to Equations 8-32), then visual artifacts can occur. It has been observed that a mismatch between the upsampling filter that was applied during pre-processing and the upsampling filter applied by a decoder or display may result in visual artifacts, often in the same areas which exhibit visual artifacts due to chroma subsampling.

In some implementations, small differences in color component values can occur when the upsampling filter applied during pre-processing implements different filter coefficients than the upsampling filter that is later used to reconstruct the color component values. As noted above, relatively small differences in R', G', and B' values of a reconstructed signal can result in significant differences in linear luminance values R, G, and B once the EOTF is applied. These differences are most noticeable when sample values are located in the range of approximately (0.5, 1), due to the highly non-linear shape of the EOTF PQ in this region, as shown in FIG. 4.

Accordingly, in various embodiments, an indication of the type of filter that was applied to a particular video bitstream during pre-processing may be signaled to a receiving device, such as a video decoder or a display device (e.g., a television, a laptop computer, a mobile phone, etc.). The receiving device may then apply the same or substantially the same type of filter when upsampling the color component(s) for display, enabling the receiving device to produce a video bitstream having color component values (e.g., chroma and/or luma) that are sufficiently close to the original video bitstream.

In some embodiments, the receiving device could use the same type of upsampling filter that is signaled to reconstruct the color components. Alternatively, the receiving device could use the signaled upsampling filter to check that a set of upsampled color component values are not significantly different than the color components values that were upsampled using the type of upsampling filter that was signaled to the receiving device.

In various embodiments, an indication of the type of filter that was used to upsample color component values at the pre-processing stage is signaled via an integer value, where the integer value is mapped to a particular type of upsampling filter or class of upsampling filters (e.g., a family of Lanczos filters). In the same or other embodiments, entropy coding and/or fixed-length coding could be used to signal the upsampling filter type to the receiving device. An indication of the type of upsampling filter could be signaled to the receiving device via an encoded video bitstream. For example, the type of upsampling filter could be signaled in a supplemental enhancement information (SEI) message, in a file format, in a file container, or by any other means. Additionally or alternatively, an indication of coefficients of a digital filter that were used during pre-processing to upsample color component values could be signaled to the receiving device via any of the techniques described herein. Several specific examples for signaling the type of upsampling filter to a receiving device are provided below.

In the embodiments shown in Table 1, a chroma upsampling filter type is signaled via a variable-length coding (VLC). For example, frequently used upsampling filter types could be signaled via shorter codes (e.g., 1-bit and/or 2-bit codes), and less frequently used filter types could be signaled via longer codes. In a specific example, a chromaUpsamplingFilter element value of 0 could specify bilinear upsampling filter, and a value of 1 could specify a Lanczos 3 upsampling filter.

TABLE 1

| Upsample filter signaling via variable-length coding (VLC) | |
| --- | --- |
| Element | Value type |
| chromaUpsamplingFilter | Vlc |

In the embodiments shown in Table 2, chromaUpsamplingFilterCoefficientsFlag is set equal to 1 to indicate that the chroma upsampling filter coefficients are being signaled in the video bitstream. Additionally, chromaUpsamplingFilterCoefficientsFlag element is set equal to 0 to indicate that chroma upsampling filter coefficients are not signaled in the video bitstream. The numberOfCoeff element may specify the number of coefficients in the chroma upsampling filter, and the chromaUpsamplingFilterCoefficient[i] element may indicate the value of the i-th filter coefficient.

TABLE 2

Signaling of chroma upsampling filter coefficients

| Element | Value type |
|---|---|
| chromaUpsamplingFilterCoefficientsFlag | int(1 bit)/bool(1 bit) |
| if (chromaUpsamplingFilterFlag){ | |
|     numberOfCoeff | vlc |
|     for ( i = 0; i < numberOfCoeff; i++) | |
|         chromaUpsamplingFilterCoefficient[i] | vlc |

In the embodiments shown in Table 3, filter coefficients of a polyphase chroma upsampling filter are signaled to a receiving device. The chromaUpsamplingFilterCoefficientsFlag element may be set equal to 1 to indicate that chroma upsampling filter coefficients of a polyphase filter are being signaled in the video bitstream. The chromaUpsamplingFilterCoefficientsFlag element may be set equal to 0 to indicate that chroma upsampling filter coefficients of a polyphase filter are not being signaled in the video bitstream. The numberOfCoeffPhase05 element specifies the number of coefficients in the chroma upsampling filter with phase 0.5. The chromaUpsamplingFilterCoefficientPhase05[i] element indicates the value of the i-th filter coefficient of phase 0.5. The numberOfCoeffPhase025 element specifies the number of coefficients in the chroma upsampling filter with phase 0.25. The chromaUpsamplingFilterCoefficientPhase025[i] element indicates the value of the i-th filter coefficient of phase 0.25.

TABLE 3

Signaling of polyphase chroma upsampling filter coefficients

| Element | Value type |
|---|---|
| chromaUpsamplingFilterCoefficientsFlag | int(1 bit)/bool(1 bit) |
| if (chromaUpsamplingFilterFlag){ | |
|     numberOfCoeffPhase05 | vlc |
|     for (i = 0; i < numberOfCoeffPhase05; i++) | |
|         chromaUpsamplingFilterCoefficientPhase05[i] | vlc |
|     numberOfCoeffPhase025 | vlc |
|     for (i = 0; i < numberOfCoeffPhase025; i++) | |
|         chromaUpsamplingFilterCoefficientPhase025[i] | vlc |

Figure 7:
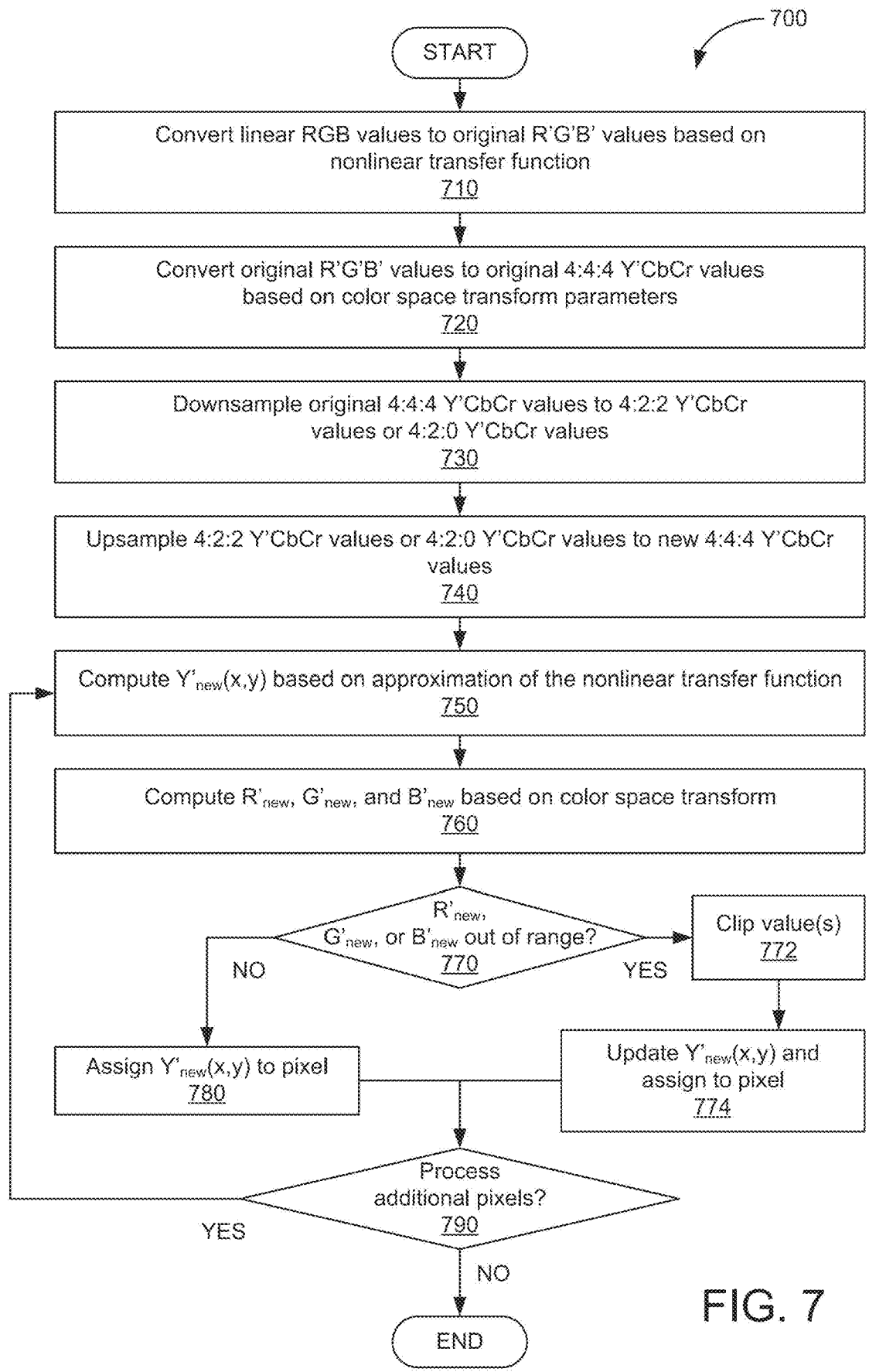
FIG. 7 illustrates a flow diagram of method steps for performing HDR color conversion correction on an image, according to various embodiments of the present invention.

FIG. 7 illustrates a flow diagram of method steps for performing HDR color conversion correction on an image, according to various embodiments of the present invention. Although the method steps are described in conjunction with the systems of FIGS. 1-3, persons skilled in the art will understand that any system configured to perform the method steps, in any order, falls within the scope of the present invention.

As shown in FIG. 7, a method 700 begins at step 710, where the color conversion application 112 converts one or more linear RGB values to $R'G'B'_{org}(x,y)$ values based on a nonlinear transfer function (e.g., an OETF PQ). Next, at step 720, the color conversion application 112 converts the $R'G'B'_{org}(x,y)$ values to $Y'CbCr_{org}$ 4:4:4 values based on transform parameters associated with a target colored space.

The color conversion application 112 then subsamples the $Y'CbCr_{org}$ 4:4:4 values to generate $Y'CbCr_{new}$ 4:2:2 values or $Y'CbCr_{new}$ 4:2:0 values.

At step 740, the color conversion application 112 upsamples the Y'CbCr 4:2:2 values or the $Y'CbCr_{org}$ 4:2:0 values to generate $Y'CbCr_{new}$ 4:4:4 values. Then, at step 750, the color conversion application 112 calculates a luma value $Y'_{new}(x,y)$ based on a closed form equation derived from an approximation of an EOTF. In various embodiments, the color conversion application 112 could calculate the luma value $Y'_{new}(x,y)$ based on any of Equations 11-13, 19, 26, 27, and/or 32. For example, the color conversion application 112 could calculate $Y'_{new}(x,y)$ based on the $R'G'B'_{org}(x,y)$ values, the $Y'CbCr_{org}(x,y)$ values, the $Y'CbCr_{new}(x,y)$ values, one or more color space transform parameters, and/or an approximation of a nonlinear transfer function, in accordance with one or more of Equations 11-13, 19, 26, 27, and/or 32.

Then, at step 760, the color conversion application 112 computes $R'_{new}$, $G'_{new}$, and $B'_{new}$ based on a color space transform (e.g., via Equation 7). At step 770, the color conversion application 112 determines whether $R'_{new}$, $G'_{new}$, and/or $B'_{new}$ are outside of a range (e.g., 0 to 1) defined by the color space. If, at step 770, the color conversion application 112 determines that $R'_{new}$, $G'_{new}$, or $B'_{new}$ are outside of the range defined by the color space, then the method 700 proceeds to step 772, where the color conversion application 112 clips the color component value(s) to the color space range. At step 774, the color conversion application 112 then computes an updated $Y'_{new}(x,y)$ value and assigns the updated $Y'_{new}(x,y)$ value to the pixel (x,y).

In some embodiments, in steps 772 and 774, the color conversion application 112 applies Equations 14, 15, 28, or 29 to compute an updated $Y'_{new}(x,y)$ value. For example, as described above in conjunction with Equation 14, when the value of a color component is clipped, the corresponding terms in Equations 6 and 9 do not depend on the value of Y', since the value of this component is equal to 1 or 0, which is the smallest or the highest value of the range. Therefore, the derivatives of these terms with respect to Y' are equal to zero. Consequently, the color conversion application 112 can remove the terms that correspond to those color components from the final equation for computing $Y'_{new}$.

Additionally, in some embodiments, at steps 772 and 774, the color conversion application 112 updates $Y'_{new}(x,y)$ by selecting, from a lookup table, an entry that stores a Y' value that corresponds to the clipped color component value(s). For example, the color conversion application 112 could select an entry that is associated with the unclipped value(s) of the one or more color component values determined at step 770. In such embodiments, the value stored in the entry of the lookup table may be a precomputed value that compensates for the clipping that will be applied by a receiving device (e.g., a television, laptop computer, mobile phone, etc.) to the one or more color component values determined at step 770.

If, at step 770, the color conversion application 112 determines that $R'_{new}$, $G'_{new}$, or $B'_{new}$ are not outside of the range defined by the color space, then the method 700 proceeds to step 780, where the color conversion application 112 assigns $Y'_{new}(x,y)$ to the corresponding pixel (x,y). At step 790, the color conversion application 112 determines whether a $Y'_{new}$ should be determined for one or more additional pixels. If additional pixels are to be processed, then the method 700 returns to step 750, where the color conversion application 112 calculates one or more additional luma values $Y'_{new}$, for example, based on the $R'G'B'_{org}$ values, the $Y'CbCr_{org}$ values, the $Y'CbCr_{new}$ values, one or more color space transform parameters, and/or an approximation of a nonlinear transfer function. The method 700 then terminates.

Although the method 700 is described with respect to specific types of color values, color space parameters, transfer functions, and approximations, the color conversion application 112 may use any type of color values, color space parameters, transfer functions, and approximations to modify Y', Cb, and/or Cr values.

Experimental Results and Computational Complexity

As discussed above, the complexity of the linear approximation approach is significantly lower than that of the conventional luma micro-grading approach. The techniques described herein use a closed form solution to find the value of in a single iteration. By contrast, the conventional micro-grading approach requires 10 iterations for a 10-bit video, including the last two boxes in the chain in FIG. 2—obtaining the R'G'B' values, applying the EOTF, and calculating the linear light luminance. Therefore, the proposed linear approximation approach has a good complexity versus quality trade-off that makes this approach well suited for real-time systems.

The algorithms described above were compared to conventional techniques that implement a luma micro-grading algorithm. Each of the algorithms was run on sequences FireEater (shown in FIGS. 5A-5C), Market (shown in FIGS. 6A-6C), and Tibul in a BT.709 container. Each sequence was 1920×1080p with a peak luminance of 4000 cd/m². In each simulation, [−2 16 54 −4]/64 and [−4 36 36 −4]/64 filters were used for vertical and horizontal upsampling, respectively. Other upsampling and downsampling filters could alternatively be used in the algorithm.

FIGS. 5A-5C and 6A-6C demonstrate the effect of the linear approximation algorithm, with weights $w_R$, $w_G$, and $w_B$ equal to the coefficients of the contribution of the R, G, and B components, respectively, to the Y component of the XYZ color space. In the case of BT.709, the weights could be 0.212639, 0.715169, and 0.072192 for $w_R$, $w_G$, and $w_B$, respectively. In the case of BT.2020, the weights could be 0.262700, 0.677998, and 0.059302 for $w_R$, $w_G$, and $w_B$, respectively.

Figure 5C:
Figure 5B:
Figure 5A:

As shown in FIGS. 5C and 6C, the image resulting from the closed form solution based on a linear approximation of the EOTF is more accurate relative to the original image than the image generated via conventional chroma downsampling.

Objective results are provided in Tables 4-7 below. The values in the Tables 4-7 represent PSNR in the linear light domain and tPSNR. tPSNR involves transforming the RGB color space to the XYZ color space, averaging the output of two transfer functions, PQ (ST.2084) and Philips, and then calculating PSNR in X, Y, and Z components.

As observed from the results in Tables 4-7, the average PSNR is increased by more than 1.75 dB compared to conventional chroma downsampling. Additionally, a 3.65 dB improvement is seen in tPSNR when implementing a linear approximation of EOTF. As compared to the slower, conventional luma micro-grading approach, the various embodiments disclosed herein yield a 0.07 dB lower average PSNR when implementing a linear approximation of the EOTF and a 0.01 dB higher average PSNR for the second degree polynomial approximation of the EOTF. The tPSNR metric is 0.17 dB lower than the conventional luma micro-grading approach, on average. In addition, the second degree approximation method results in a slightly better PSNR and tPSNR measures than the linear approximation.

Notably, each of the techniques disclosed herein significantly improve the subjective quality of the tested videos, removing perceptual artifacts. Another observation is that the techniques disclosed herein produce smoother luma than the conventional chroma downsampling, likely resulting in gains in subsequent compression of the resulting video.

TABLE 4

Direct downsampling of chroma components

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| FireEater | 50.80 | 71.20 | 67.45 | 63.15 | 54.48 | 57.13 | 54.76 | 55.30 |
| Market | 46.35 | 58.59 | 48.98 | 51.31 | 47.22 | 49.31 | 44.59 | 46.61 |
| Tibul | 62.51 | 82.75 | 81.61 | 75.62 | 50.26 | 52.21 | 59.73 | 52.56 |
| Total | 53.22 | 70.85 | 66.01 | 63.36 | 50.65 | 52.88 | 53.03 | 51.49 |

TABLE 5

Results of conventional luma micro-grading

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| FireEater | 57.92 | 68.95 | 66.79 | 64.55 | 64.34 | 70.91 | 53.20 | 57.58 |
| Market | 48.29 | 59.87 | 49.81 | 52.66 | 55.43 | 69.38 | 45.69 | 50.00 |
| Tibul | 71.36 | 82.69 | 80.94 | 78.33 | 62.43 | 66.94 | 54.45 | 58.33 |
| Total | 59.19 | 70.50 | 65.85 | 65.18 | 60.73 | 69.08 | 51.11 | 55.31 |

TABLE 6

Second cost function D and linear approximation of EOTF

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| FireEater | 56.69 | 69.86 | 66.96 | 64.50 | 63.89 | 70.22 | 53.23 | 57.56 |
| Market | 48.17 | 59.71 | 49.71 | 52.53 | 55.37 | 63.93 | 45.59 | 49.87 |

TABLE 6-continued

Second cost function D and linear approximation of EOTF

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| Tibul | 71.05 | 82.87 | 80.96 | 78.29 | 62.18 | 65.83 | 54.13 | 57.99 |
| Total | 58.64 | 70.81 | 65.88 | 65.11 | 60.48 | 66.66 | 50.98 | 55.14 |

TABLE 7

Second cost function D and second degree approximation of EOTF

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| FireEater | 58.05 | 68.71 | 66.74 | 64.50 | 64.31 | 70.33 | 53.17 | 57.54 |
| Market | 48.30 | 59.93 | 49.85 | 52.69 | 55.16 | 64.78 | 45.66 | 49.92 |
| Tibul | 71.39 | 82.67 | 80.94 | 78.33 | 62.55 | 66.74 | 54.39 | 58.29 |
| Total | 59.24 | 70.44 | 65.84 | 65.17 | 60.67 | 67.28 | 51.07 | 55.25 |

In sum, a color conversion application downsamples chroma values and then upsamples the chroma values by applying an upsampling filter. The color conversion application then modifies one or more of the downsampled Y'CbCr values such that the reconstruction of these values to a linear RGB signal produces values similar to those of the original linear RGB signal. In various embodiments, the color conversion application calculates an optimal value of Y', while keeping the values of Cb and Cr constant, by evaluating a closed form solution that is based on an approximation of a nonlinear transfer function. The calculated value of Y' may further be converted into R', G', B' values in order to determine whether any of the R', G', B' are outside of a defined color space range. If one or more of the R', G', B' values is outside of the defined color space range, then the value(s) may be clipped, and Y' may be recomputed based on the clipped value(s).

At least one advantage of the disclosed techniques is that the resulting reconstructed HDR images are more accurate relative to the original HDR images than images generated via conventional chroma downsampling. Additionally, the complexity of the disclosed techniques is significantly lower than that of the conventional approaches, enabling an optimal component value (e.g., a luma value) to be determined in real-time via fewer iterations (e.g., one or two iterations) than in conventional approaches. Further, because the type of filter applied during pre-processing of the HDR images can be signaled to a receiving device, the receiving device is able to account for the filter type and generate images that are more accurate relative to the original HDR images.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable storage media including instructions that, when executed by one or more processors, cause the one or more processors to perform the steps of:
    downsampling first color space values to generate downsampled color space values;
    upsampling the downsampled color space values via a first upsampling filter type to generate second color space values;
    modifying at least one component value included in the downsampled color space values based on a first component value included in the first color space values, a second component value included in the second color space values, and an approximation of a nonlinear transfer function; and
    performing one or more operations for at least one of (i) storing an indication of the first upsampling filter type in conjunction with a video bitstream associated with the at least one component value, and (ii) transmitting the indication of the first upsampling filter type to a receiving device in conjunction with the video bitstream.

2. The one or more non-transitory computer-readable storage media of claim 1, wherein, based on the indication, the receiving device applies the first upsampling filter type to generate a video signal that corresponds to the video bitstream.

3. The one or more non-transitory computer-readable storage media of claim 1, wherein the indication comprises an integer value included in a plurality of integer values, and each integer value included in the plurality of integer values corresponds to a different upsampling filter type included in a plurality of upsampling filter types.

4. The one or more non-transitory computer-readable storage media of claim 1, wherein the indication comprises a fixed-length value included in a plurality of fixed-length values, and each fixed-length value included in the plurality of fixed-length values corresponds to a different upsampling filter type included in a plurality of upsampling filter types.

5. The one or more non-transitory computer-readable storage media of claim 1, wherein the indication comprises a variable-length value included in a plurality of variable-length values, and each variable-length value included in the plurality of variable-length values corresponds to a different upsampling filter type included in a plurality of upsampling filter types.

6. The one or more non-transitory computer-readable storage media of claim 1, wherein the indication of the first upsampling filter type is included in a supplemental enhancement information (SEI) message associated with the video bitstream.

7. The one or more non-transitory computer-readable storage media of claim 1, wherein the indication of the first upsampling filter type is included in at least one of a file format associated with the video bitstream and a file container associated with the video bitstream.

8. The one or more non-transitory computer-readable storage media of claim 1, wherein the indication of the first upsampling filter type indicates a plurality of coefficients associated with the first upsampling filter type.

9. The one or more non-transitory computer-readable storage media of claim 1, further comprising performing one or more operations for at least one of (i) storing a second indication of a number of coefficients associated with the first upsampling filter type in conjunction with the video bitstream, and (ii) transmitting the second indication of the number of coefficients to the receiving device in conjunction with a video bitstream.

10. The one or more non-transitory computer-readable storage media of claim 1, wherein the at least one component value comprises at least one luma value.

11. The one or more non-transitory computer-readable storage media of claim 1, wherein the approximation of the nonlinear transfer function comprises at least one of a linear approximation of an electro-optical transfer function (EOTF) and a second order approximation of the EOTF.

12. A method, comprising:
    downsampling first color space values to generate downsampled color space values;
    upsampling the downsampled color space values via a first upsampling filter type to generate second color space values;
    modifying at least one component value included in the downsampled color space values based on a first component value included in the first color space values, a second component value included in the second color space values, and an approximation of a nonlinear transfer function; and
    performing one or more operations for at least one of (i) storing an indication of the first upsampling filter type in conjunction with a video bitstream associated with the at least one component value, and (ii) transmitting the indication of the first upsampling filter type to a receiving device in conjunction with the video bitstream.

13. The method of claim 12, wherein, based on the indication, the receiving device applies the first upsampling filter type to generate a video signal that corresponds to the video bitstream.

14. The method of claim 12, wherein the indication comprises an integer value included in a plurality of integer values, and each integer value included in the plurality of integer values corresponds to a different upsampling filter type included in a plurality of upsampling filter types.

15. The method of claim 12, wherein the indication comprises a fixed-length value included in a plurality of fixed-length values, and each fixed-length value included in the plurality of fixed-length values corresponds to a different upsampling filter type included in a plurality of upsampling filter types.

16. The method of claim 12, wherein the indication comprises a variable-length value included in a plurality of variable-length values, and each variable-length value included in the plurality of variable-length values corresponds to a different upsampling filter type included in a plurality of upsampling filter types.

17. The method of claim 12, wherein the indication of the first upsampling filter type is included in a supplemental enhancement information (SEI) message associated with the video bitstream.

18. The method of claim 12, wherein the indication of the first upsampling filter type is included in at least one of a file format associated with the video bitstream and a file container associated with the video bitstream.

19. The method of claim 12, wherein the indication of the first upsampling filter type indicates a plurality of coefficients associated with the first upsampling filter type.

20. A computing device, comprising:
a memory that includes a color correction application; and
a processor that is coupled to the memory and, when executing the color correction application, is configured to:
downsample first color space values to generate downsampled color space values;
upsample the downsampled color space values via a first upsampling filter type to generate second color space values;
modify at least one component value included in the downsampled color space values based on a first component value included in the first color space values, a second component value included in the second color space values, and an approximation of a nonlinear transfer function; and
perform one or more operations for at least one of (i) storing an indication of the first upsampling filter type in conjunction with a video bitstream associated with the at least one component value, and (ii) transmitting the indication of the first upsampling filter type to a receiving device in conjunction with the video bitstream.

* * * * *